May 13, 1958 V. C. LYNFORD 2,834,472
SCAVENGING FILTER
Filed Aug. 12, 1955 3 Sheets-Sheet 1

Inventor:
Vincent C. Lynford,
By Merriam, Lorch,
Attys.

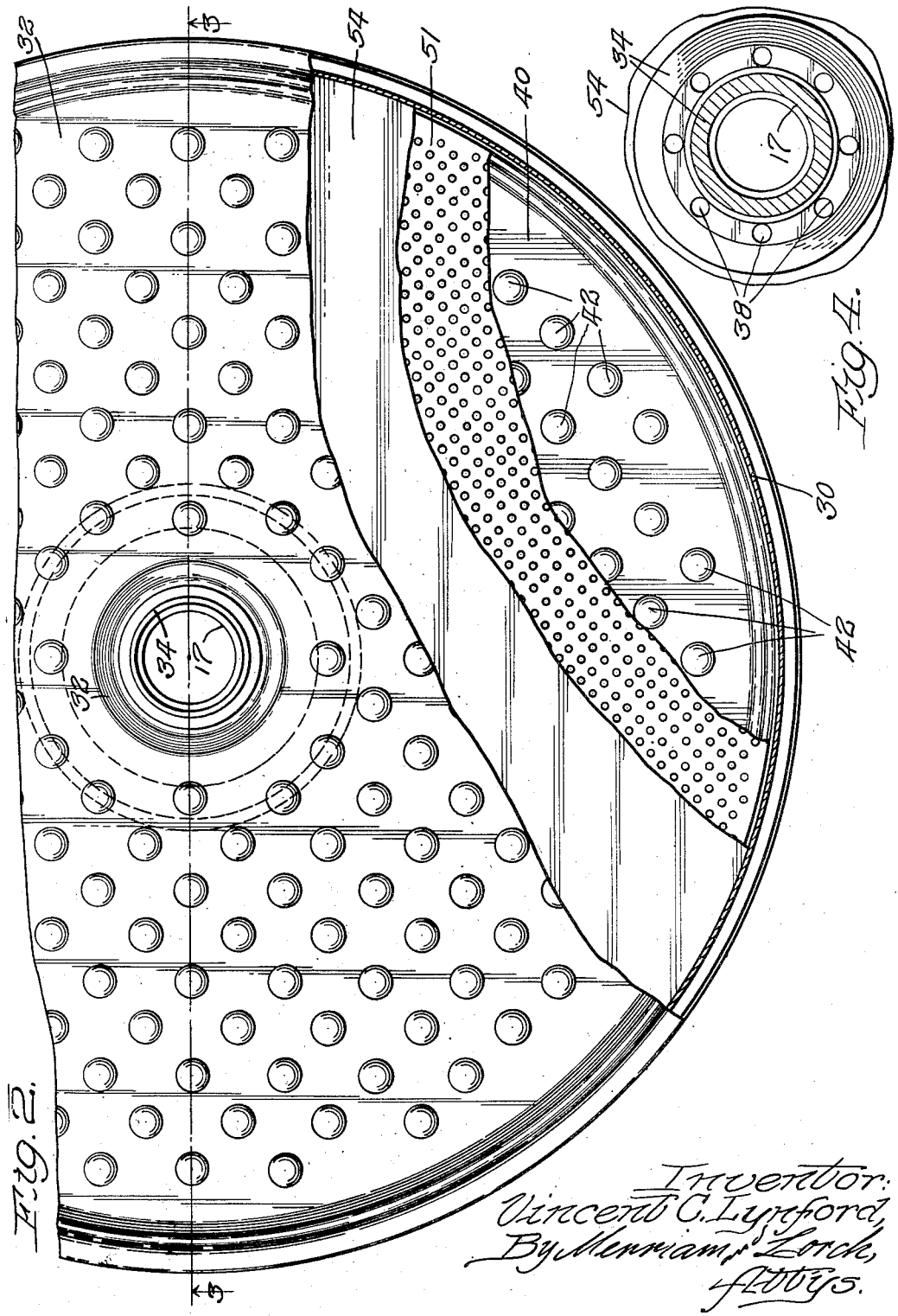

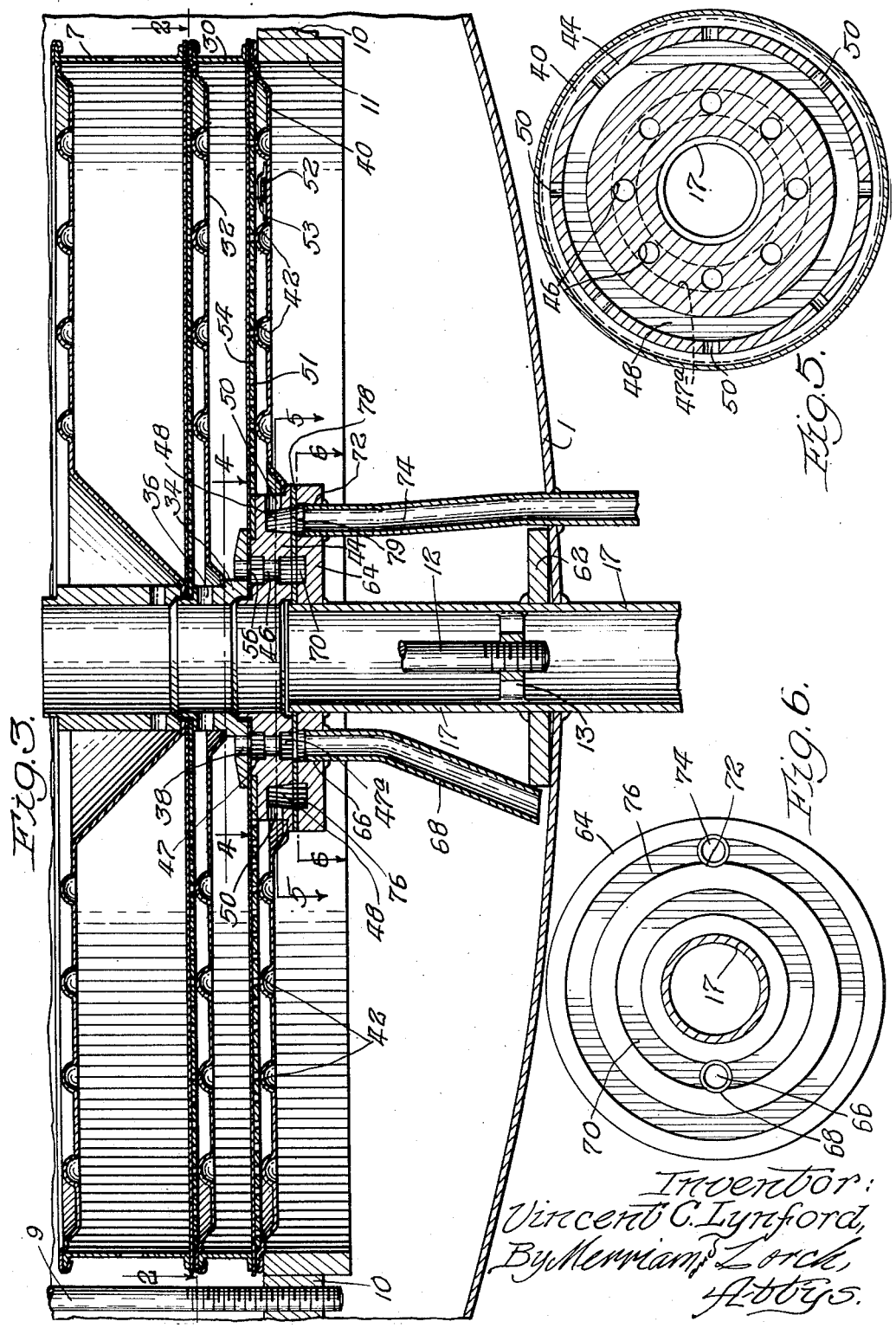

United States Patent Office 2,834,472
Patented May 13, 1958

2,834,472

SCAVENGING FILTER

Vincent C. Lynford, Libertyville, Ill., assignor to Sparkler Mfg. Co., a corporation of Illinois Application August 12, 1955, Serial No. 527,975

7 Claims. (Cl. 210—314)

This invention relates to a filter of the type in which a plurality of horizontal filter units is assembled into a tier within a tank, usually a cylindrical tank. In such filters provision is made for the liquid to circulate within the tank and around the outer side of the units, through the filtering media thereof, and into a central discharge column.

The present filter is of the general type and an improvement over those shown in the Kracklauer Patents 2,615,574 of October 28, 1952, and 2,624,465 of January 6, 1953. As stated in these patents, filters of these types are primarily industrial filters for filtering fluids such as chemicals, oils, syrups, wines, varnishes, paints, and the like.

The improvement has to do with what are known in the trade as "scavenger plates" or "units" the purpose of which is to permit filtering of the fluid being filtered to the very bottom or as closely thereto as possible of the tank. Scavenger plates as now constructed are generally located near the bottom of the tank which must be flat for maximum elimination of the fluids being filtered. This means, that the bottom must be appreciably heavier than the shell or wall thickness of the tank to withstand internal pressures. There is a further disadvantage to flat bottom tanks in that a certain amount of liquid always remains in the tank and cannot be scavenged with the result that when the cartridge or tier of filter units is removed for cleaning, this remaining liquid can, and frequently does, enter the main outlet pipe.

In accordance with this invention a round bottom tank can be used thus permitting substantially complete removal of any remaining liquid after a filtering cycle. The scavenger plate is so arranged that the remaining liquid in the bottom of a tank, after a filtering cycle, can be forced by pressure through the scavenger unit where it is filtered and forced out through a second discharge pipe.

A better understanding will be had of this invention from consideration of the accompanying drawings in which:

Figure 2 is a fragmentary horizontal section taken approximately on line 2—2 of Figure 3.

Figure 3 is a partial vertical section taken along line 3—3 of Figure 2 illustrating in particular the scavenging section of the filter.

Figure 4 is a section of the central portion of the scavenging section taken along line 4—4 of Figure 3.

Figure 5 is a similar view taken along line 5—5 of Figure 3, and

Figure 6 is a similar view taken along line 6—6 of the Figure 3.

Figure 1:
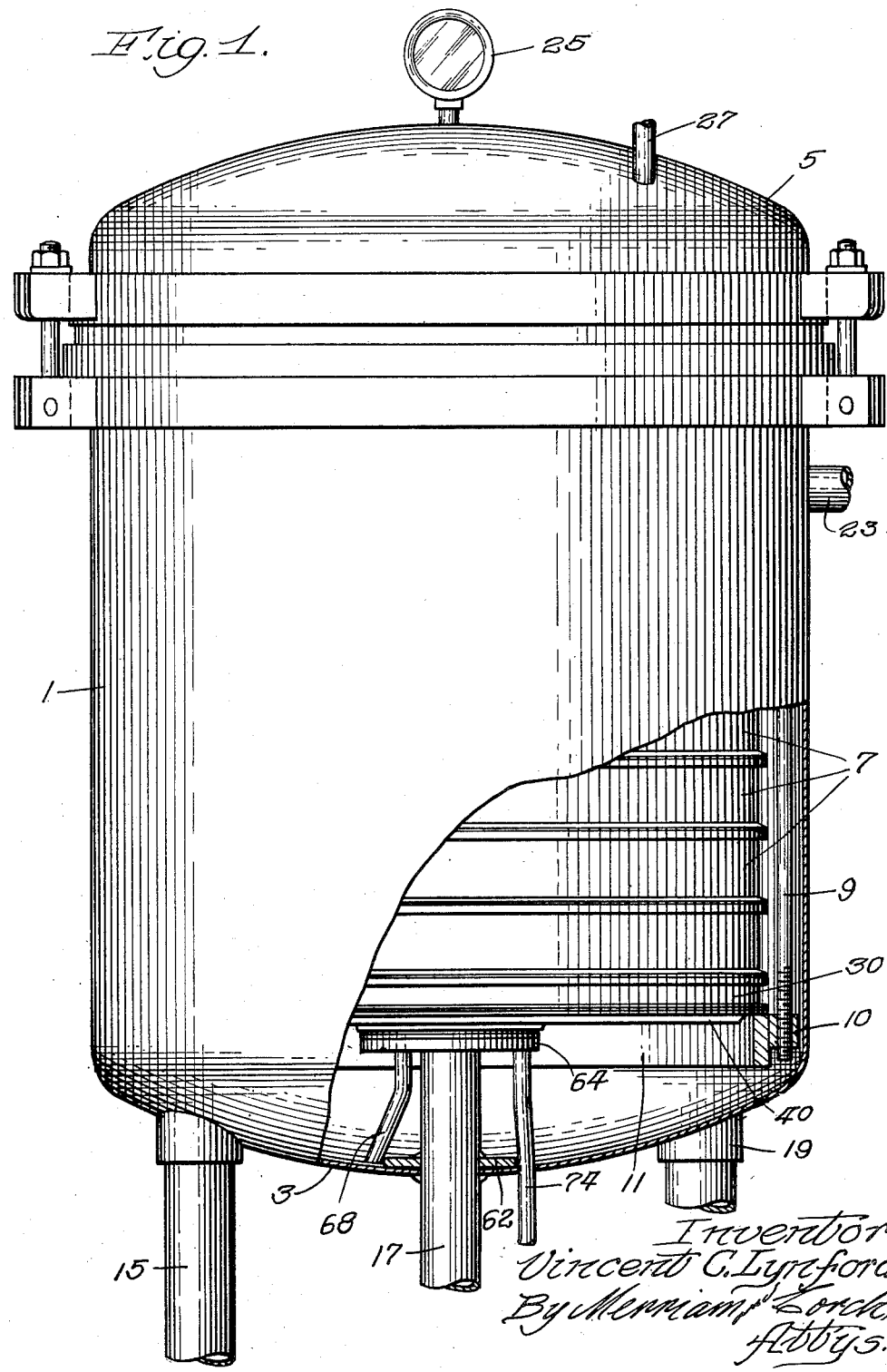
Figure 1 is a side elevation, partially broken away, illustrating a horizontal plate filter embodying the construction of this invention.

As shown in the prior Kracklauer patents the complete filtering apparatus is housed within a tank 1 having a rounded bottom 3 and a removable tightly sealable cover 5. The tank may be supported upon legs, not shown, or in any other suitable manner. The filter is made up of a series of horizontal plate units 7, held together and sealed at their outer peripheries as well as their centers as shown in the prior Patents 2,615,574 and 2,624,465. That is, bolts 9 threaded into lugs or ring 10 welded to the bottom support 11, as illustrated in Figure 1, clamp the outer peripheries and a single central bolt 12 threadedly engaging a spider 13 in the central discharge clamps the centers together. For further details as to how the units are held together reference is made to patents heretofore referred to.

The filter units themselves, such as unit 7, may be of the type shown in the aforesaid patents or they may be of other types well known in this art. The details of the filter units comprise no part of this invention and, therefore, details of their construction are not given.

The tank is provided with an inlet 15 which conducts fluids to be filtered to the interior of the tank and around the filter units. The fluid then passes through apertures in the side walls of the filter units, through the filter paper, through the perforated plates of the units and out through central openings into the core of the filter units and down through the discharge tube 17. An additional drain 19 (Fig. 3) is also provided for flushing purposes. The tank is also provided with a pressure inlet 23 (Fig. 1) for admitting air under pressure to the interior of the tank for scavenging purposes. As is customary, the removable cover is further provided with a pressure gauge 25 and a blow-off connection 27.

The scavenging unit including a separate filter unit is secured and sealed to the lower surface of the lowermost imperforate plate 32 of the bottom filter unit 7 and is spaced therefrom by an annular channel-shaped rim 30 similar to the outer rims or walls of the filter units except that rim 30 may be shallower and has no perforations. The upper flange of rim 30 engages the undersurface of the imperforate plate 32, the latter being curled over the upper flange of rim 30. Thus the outer wall is closed to the tank as distinguished from the regular filter units.

The central opening of plate 32 is welded to an upper scavenger center cup 34 instead of the usual cup which constitutes an extension of the center column of the filter unit and is shouldered to receive the lower plate 32 of the bottom filter unit. Cup 34 is provided with 4 horizontal drilled holes 36 above plate 32 leading to the center column, i. e. into the discharge tube 17 which carries off the filtrate from the last filter unit. Cup 34 is provided with a lower flange below plate 32 having a series of vertical holes 38 therethrough (preferably 8 or more) for purposes which will be described later.

The lower flange of rim 30 is secured to a second imperforate plate 40 having a series of buttons or raised areas 42 embossed over substantially the entire area in staggered relation. Plate 40 is also provided with a central opening for the reception of a lower scavenger center cup 44 to which the lower plate is preferably welded, the cup being provided with an angular seating flange for this purpose. Cup 44 is provided with a central bore which constitutes a continuation of the discharge tube and also with a series of vertical holes 46 in communication with annular grooves 47 and 47a in the upper and lower faces thereof, respectively. The upper groove 47 is in line with and, therefore in communication with holes 38. Cup 44 is further provided with an annular groove 48 in its lower face which communicates with a plurality of horizontal openings 50 extending to the outer margins of the cup and communicating with the space above plate 40 for purposes later to be described.

A perforated plate 51 rests upon the buttons 42 of plate 40, i. e. spaced from plate 40 and with its outer margin in a recessed flange of plate 40 and having its inner margin in a recessed ledge formed on the upper side of cup 44. The perforated plate may be retained in position by means of a clip 52 on plate 51 engaging a stirrup 53 on plate 40. A filter disc 54 of any suitable filtering medium such as paper rests on the upper surface of plate 51. The overlying filter sheet 54 is provided, in addition to the usual center opening, with a series of arcuate openings 56, overlying upper groove 47 and in position to permit passage through openings 38 and 46 from inlet 68. Because of these additional holes it may be readily identified from the regular filter medium for the filter units. The scavenger plate filter sheet requires no special location on the scavenger plate. The inner edges of perforated plate 51 and the filter sheet 54 are clamped between the lower surface of the lowermost flange of the upper scavenger cup 34 and the upper surface of lower cup 44.

The entire scavenging unit and the filtering unit above it is supported upon the upper end of the center discharge pipe or tube 17 which projects through the bottom of the tank 1 and is welded thereto on the exterior of the tank. The latter is re-enforced by plate 62 welded to the inner surface thereof, and to the tube 17. The upper end of the discharge tube 17 is welded to a flange 64 having an inlet opening 66 for receiving an inlet tube 68 extending closely, for example ¼ inch, toward the bottom of the tank at one end and communicating at its other end with an annular channel 70 in the upper surface of the flange, directly below the lower groove 47a. The flange is also provided with a discharge opening 72 for receiving a discharge tube 74. Opening 72 communicates with a second annular channel 76 also formed in the upper surface of flange 64. Between the upper surface of flange 64 and the lower surface of lower cup 44 is a relatively, preferably, thick rubber gasket 78.

Gasket 78 is provided with a series of inner arcuate slots 79 in position to communicate with channel 70 and a second series of arcuate slots in position to communicate with channel 76 which eliminate the necessity of locating or matching inlet or outlet openings. In other words, the gasket will function in any position.

As previously stated, the outer peripheries of the filter units and the scavenging unit are held in sealed relation by bolts 9 as shown more fully in the prior patents mentioned and the inner peripheries of the filter units together with scavenging units are held in sealed engagement with each other and with flange 64 by means of the central bolt 12 extending downwardly from the top of the filter unit through the center of and through a spider 13 as shown more particularly in the Kracklauer Patent No. 2,278,453 or Kracklauer Patent No. 2,615,574 to which reference is made for further details of construction.

In operation, whenever it is desired for cleaning or other purposes, the remaining amount of liquid at the end of a cycle may be filtered and removed as follows: At the end of the filtration cycle both the main outlet and input are closed. Air under pressure is introduced into the tank through the pipe 23 and the remaining liquid is then forced upwardly by this pressure through the tube 68, through the channel 70, lower groove 47a, openings 46, upper groove 47, channel 56, and openings 38 into the space between the imperforate plate 32 and the filter disc 54 overlying the perforated plate 51. The fluid then passes through the filter disc and perforated plate to the space between the perforated plate 51 and the imperforated plate 40, thence through openings 50 to channel 48 and channel 76 and opening 72 into discharge tube 74. Thus it can be seen that substantially the entire contents of tank 1 may be filtered and discharged without any possibility of unfiltered fluids getting into discharge tube 17 and without the necessity of building extra heavy tank bottoms.

It will be observed from the foregoing that this invention provides substantially complete scavenger action by a construction which minimizes special parts, and eliminates most of the expensive machining usually required in other constructions. Furthermore, a dished bottom tank may be used instead of a flat bottom which, of necessity, must be increased in thickness to withstand the strains. The construction also provides for practically 100% removal and filtration of the remaining liquids with no possible chance of unfiltered liquid entering the filtrate lines. In addition, the construction eliminates hidden corners or depressions which in prior constructions made it practically impossible to clean the filter.

It will be apparent to those skilled in the art that minor changes may be made in details of construction without departing from the spirit and scope of the invention as defined in the appended claims.

I claim:

1. In a filter apparatus of the type having one or more filter units in a sealed tank wherein fluid is filtered through the sides of said units and into a center discharge column; a scavenging unit positioned below the lowermost filter unit and comprising a separate filtering unit having imperforate side walls; an inlet tube connected to one side of said latter unit and extending to a point closely adjacent the bottom of said tank and a discharge tube connected to the other side of said separate unit and extending through said tank; and a pressure connection connected to said tank whereby pressure may be placed upon the fluid in said tank.

2. In a filter apparatus as defined in claim 1 wherein said scavenging unit is secured, and sealed to the lowermost filter unit and being closed to said tank except through said inlet tube.

3. In a filter apparatus as defined in claim 1 wherein said scavenging filter unit comprises an imperforate plate spaced from the bottom of the tank; a perforated plate overlying and spaced from said imperforate plate; a filter medium overlying said perforated plate, said inlet tube communicating with the space above said filter medium and its underlying perforated plate and said discharge tube communicating with the space below said perforated plate and above said imperforate plate.

4. In a filter apparatus as defined in claim 2 wherein said scavenging filter unit comprises an imperforate plate spaced from the bottom of the tank; a perforated plate overlying said imperforate plate and spaced therefrom; a filter medium overlying said perforated plate, said inlet tube communicating with the space above said filter medium and perforated plate and said discharge tube communicating with the space below said perforated plate and above said imperforate plate.

5. In a filter apparatus as defined in claim 1 wherein said scavenging unit is supported at its outer rim from said filter units.

6. In a filter apparatus as defined in claim 1 wherein said scavenging unit is supported at its center from said center discharge of said filter units.

7. In a filter apparatus as defined in claim 5 wherein said scavenging unit is supported at its center from said center discharge of said filter units.

References Cited in the file of this patent

UNITED STATES PATENTS

| | | |
|---|---|---|
| 802,105 | Johnson et al. | Oct. 17, 1905 |
| 1,120,629 | Salisbury | Dec. 8, 1914 |
| 2,278,453 | Kracklauer | Apr. 7, 1942 |
| 2,615,574 | Kracklauer | Oct. 28, 1952 |
| 2,624,465 | Kracklauer | Jan. 6, 1953 |